United States Patent [19]
Rich, Jr.
[11] 3,813,658
[45] May 28, 1974

[54] MOVABLE-OBJECT IDENTIFICATION SYSTEM

[75] Inventor: Edward Rich, Jr., College Park, Md.
[73] Assignee: Walter I. Charlton, College Park, Md. ; a part interest

[22] Filed: Mar. 22, 1972
[21] Appl. No.: 236,924

[52] U.S. Cl. .................... 340/146.3 K, 235/61.11 D
[51] Int. Cl. ......................... G06k 7/015, G06k 7/08
[58] Field of Search .. 340/146.3 K, 152 T, 174.1 R, 340/347 P; 235/61.12 M, 61.11 D; 343/6.5 SS; 179/100.2 A

[56] References Cited

UNITED STATES PATENTS

| | | | |
|---|---|---|---|
| 2,857,476 | 10/1958 | Kleiber | 179/100.2 A |
| 2,844,665 | 7/1958 | Mann et al. | 179/100.2 A |
| 2,952,008 | 9/1960 | Mitchell et al. | 235/61.12 M |
| 3,016,456 | 1/1962 | Corporon | 340/146.3 K |
| 3,170,154 | 2/1965 | Fleming | 340/347 P |
| 3,192,521 | 6/1965 | Sullivan | 340/347 P |
| 3,402,836 | 9/1968 | Debrey et al. | 340/174.1 R |
| 3,531,627 | 9/1970 | Ham | 235/61.12 M |
| 3,581,030 | 5/1971 | Sedley | 235/61.11 D |
| 3,582,969 | 6/1971 | Kinney | 235/92 TC |
| 2,857,476 | 10/1958 | Kleiber | 179/100.2 A |
| 3,192,521 | 6/1965 | Sullivan | 340/347 P |
| 3,626,160 | 12/1971 | Hagopian | 235/61.11 D |
| 3,676,644 | 7/1972 | Vaccaro et al. | 235/61.11 D |
| 3,712,973 | 1/1973 | Karl | 235/61.11 D |

*Primary Examiner*—Paul J. Henon
*Assistant Examiner*—Joseph M. Thesz, Jr.
*Attorney, Agent, or Firm*—Griffin, Branigan and Butler

[57] ABSTRACT

A railroad car identification system is described herein which includes a magnetic identification record mounted on a railroad car and a stationary sensing means for reading information from the identification record as the railroad car passes the stationary sensing means. The system comprises a channeling means and a follower which is guided through the channeling means as the railroad car passes the stationary sensing means. In this manner the identification record is held in close proximity to a sensing element of the stationary sensing means. In one embodiment the channeling means is a part of the identification record and mounted on the railroad car and in another embodiment the follower is a part of the identification record and mounted on the railroad car. In both embodiments provision is made for modifying information on the identification record. Various modifications of both embodiments are described.

Also described herein is an electrical circuit for processing information read from the identification record. The circuit includes circuitry for storing such information on a shift register and circuitry for subsequently transferring such information to a computer.

24 Claims, 22 Drawing Figures

MOVABLE-OBJECT IDENTIFICATION SYSTEM

BACKGROUND OF THE INVENTION

This invention relates broadly to the art of movable object identification systems and more particularly to the art of magnetic-type railroad-car identification systems.

The railroad industry has been attempting for many years to devise a durable and efficient system for automatically identifying rolling stock for freight transfer. Numerous systems have been proposed over the past years. Some of these systems are optical systems which basically involve the recognition of painted reflective designations on railroad cars. One problem with such a system is that the reflective designations collect carbon, dirt or other substances which reduce their reflectiveness and thereby cut down on the efficiency of the system's operation. In addition, ambient conditions such as light, fog, smoke and other error producing parameters, sometimes result in unacceptable identification errors.

Another problem with optical scanning systems is that they often employ highly complex scanning equipment which requires many mechanical moving parts. The complexity of such systems increases the likelihood of mechanically induced errors.

Thus, it is an object of this invention to provide a railroad-car identification system which is not signficantly affected by outside influences and which produces accurate results with relatively high mechanical reliability.

Systems have also been proposed which comprise magnetic records attached to railroad cars and magnetic reading means positioned along railroad tracks for reading the information from the magnetic records. One difficulty with such systems is that, normally, sensing elements of the magnetic reading means must be brought into close proximity to the magnetic records in order to accurately read information therefrom. In many prior art systems, sensing elements, positioned along railroad tracks, and information records, positioned on railroad cars, are located so that they will pass closely adjacent to one another. This arrangement is sometimes unsatisfactory because structural tolerances of railroad cars dictate a margin of error that is sometimes too wide for magnetic flux to effectively bridge. In this regard, it is a further object of this invention to provide a movable object identification system which brings a sensing element in close proximity to an identification record regardless of normal structural deviations of railroad cars.

Another difficulty with prior art magnetic, railroad-car identification systems is that some of them employ flux amplitude to convey information from an identification record to a sensing element. Flux magnitude is sometimes dependent upon ambient conditions as well as the distance between the identification record and the sensing element; thus, the use of flux amplitude is sometimes unsatisfactory for this purpose.

Thus, it is an object of this invention to provide a magnetic-type movable object identification system which does not employ flux magnitude to convey information.

Another problem that exists with some prior-art, magnetic, railroad-car identification systems is that, during operation thereof, a first magnetic element is not brought directly between separated portions of a second magnetic element. This, of course, means that flux lines extending between the separated portions of the second magnetic element must travel unduly far in order to also pass through the first magnetic element.

Thus, it is an object of this invention to provide a magnetic, railroad-car identification system in which, during operation thereof, a first magnetic element is brought directly between separated portions of a second magnetic element.

Many prior art railroad car identification systems utilize binary words as identifying markings on railroad cars. In this regard, in the case of some magnetic systems which employ magnets as information elements on railroad cars, magnets are respectively oriented in a first north/south pole configuration to indicate a binary 1 and in an opposite north/south pole configuration to indicate a binary 0. In some prior-art magnetic, railroad car identification systems the sensor-system logic circuits thereof, do not allow crosswise orientation of magnetic elements within magnetic records. That is, the magnets must be longitudinally (north-south) oriented along the paths of travel of the movable objects, in order to produce a signal in a sensor coil which can be used by the logic circuits. This, of course, means that information tracks of identification records are unduly long. It is therefore still another object of this invention to provide an identification system having a logic circuit which accepts and processes an induced output signal even though magnetic elements of records have crosswise orientations rather than longitudinal orientations.

SUMMARY OF THE INVENTION

According to principles of this invention, a railroad car identification system comprises a channeling member and a follower member, with the follower member being guided through the channeling member as the railroad car passes a stationary sensing means. In one embodiment, the channeling member is attached to a railroad car and forms a portion of an identification record while the follower forms a portion of a stationary sensing means; and in another embodiment the channeling member forms a portion of the stationary sensing means while the follower member forms a portion of the identification record. In both embodiments, the intermeshing channeling member and the follower member hold a sensing element of the stationary sensing means in close proximity to magnetic-material identification elements of the identification record as the railroad car passes the stationary sensing means. Likewise, in both embodiments, the sensing element and the magnetic-material identification elements can be in various forms.

Also according to principles of this invention a sensor logic circuit is described for obtaining a stored binary code from signals induced in the sensing element by the magnetic-material identification elements. Basically, in the circuit, sinusoidal waves have leading edges either positive or negative in sense. The positive and negative halves of each wave of the induced signals are separated onto separate lines, the positive line being used as an information channel. The negative half-cycle waves are then inverted into positive half-cycle waves. These waves are converted to discrete pulses and recombined with positive pulses from the information channel produced from the positive half cycle waves. Every odd pulse of the recombined pulses is used to shift a shift register. Pulses appearing on the information channel are fed into the shift register. Thus, where there is a positive pulse on the information channel, simultaneously with an odd recombined pulse, the shift register shifts a binary 1 into the shift register. On the other hand, when the shift register is shifted with no pulse on the information channel a binary 0 is shifted into the shift register.

Also, according to principles of this invention, when the shift register is full it emits a signal which turns on a clock circuit for shifting information from the shift register to a computer. The clock pulses are counted and when a sufficient number of clock pulses have been fed to the shift register to empty it the clock circuit is automatically turned off. Time-delay circuits which are respectively activated by the first odd shifting pulse fed to the shift register and the first clock counter pulse fed to the shift register clear all registers and counters after predetermined elapses of time.

BRIEF DESCRIPTION OF THE DRAWINGS

The foregoing and other objects, features and advantages of this invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating the principles of the invention in a clear manner.

DESCRIPTION OF PREFERRED EMBODIMENTS

Figure 1:
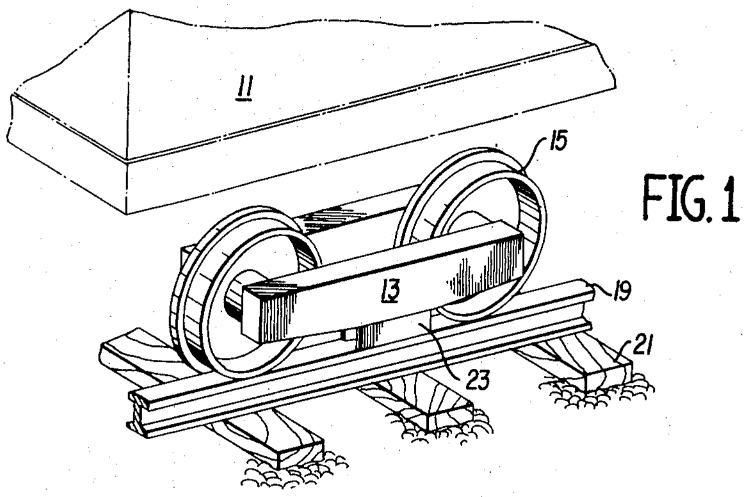
FIG. 1 is an isometric view of a portion of a railroad car having an identification plaque thereon employing principles of this invention.
Figure 2:
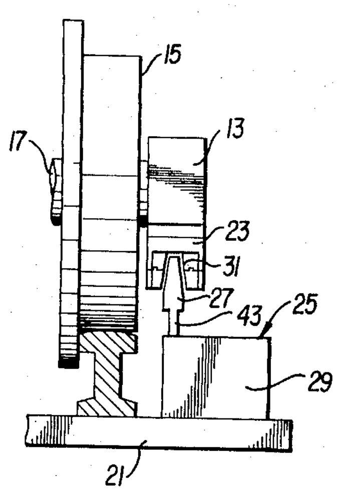
FIG. 2 is an end view of a portion of the railroad car of FIG. 1 while passing over a stationary sensor system employing principles of this invention.

Turning now to FIGS. 1 and 2, there is shown a railroad car 11 having a wheel truck 13, wheels 15, and a wheel axle 17. The railroad car 11 is traveling along a track 19 which is mounted on railroad ties 21.

Shown in FIGS. 1 and 2 is an identification record or identification plaque 23 which contains identifying indicia for identifying the railroad car 11 in a manner described below.

In FIG. 2 the identification plaque 23 is depicted passing over a stationary sensor system 25 which includes a sensing head or a follower element 27 and a sensor-system logic circuit 29. The sensor system 25 is mounted on a railroad tie 21 in order to synchronize motion between the sensor system 25 and the identification plaque 23.

Figure 3:
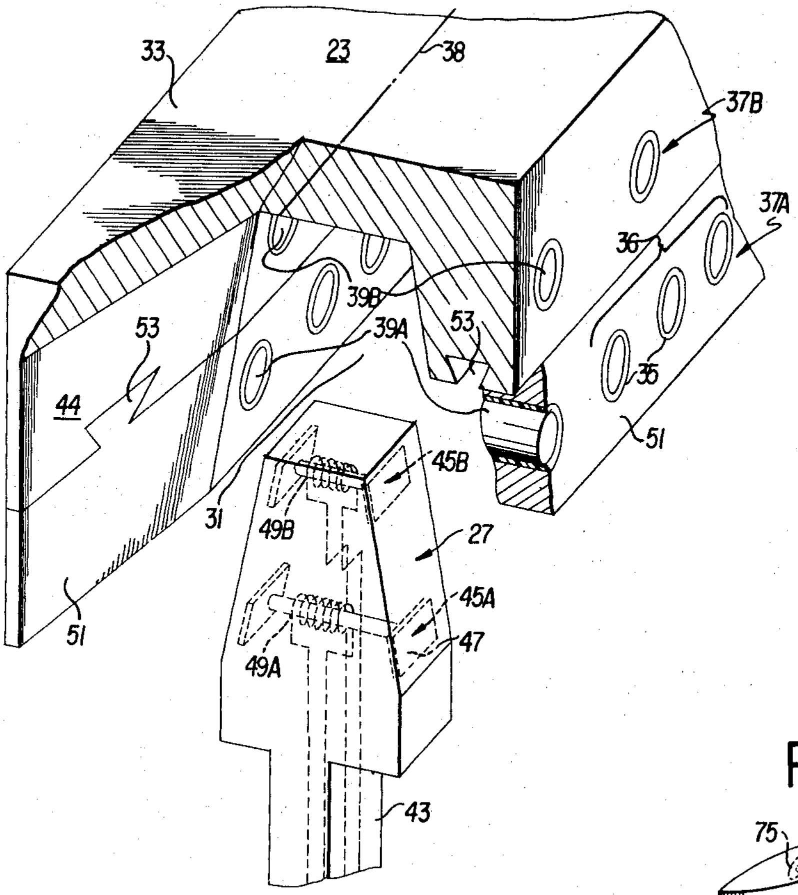
FIG. 3 is an enlarged isometric view of the identification plaque and the stationary sensor head of FIGS. 1 and 2.

As can be seen in FIG. 2, and even more clearly in FIG. 3, the identification plaque 23 is in the shape of an inverted trough and defines a channel 31 which guides the sensing head or follower element 27. Thus, for the FIGS. 1–3 embodiment of this invention, the identification plaque will often be referred to as a channeling member in this specification.

The identification plaque or channeling member 23 comprises a plastic housing 33 and arrays of magnetic elements 35 embedded therein. In this regard, it should be noted that the magnetic elements 35 are arranged in rows extending linearly along the identification plaque or channeling member 23. Two rows, positioned on opposite sides of the channel 31 from one another, form a track 37 comprising element pairs 39. There are two tracks 37A and B shown in FIG. 3. Each track contains a binary word which is composed of element pair bits. Further, each of the magnetic elements 35 is oriented crosswise to a longitudinal axis 38 of the identification plaque 23.

In one mode of the FIGS. 1–3 embodiment of this invention the magnetic elements 35 are permanent magnets. In this mode the respective two magnets which comprise element pairs 39 have oppositely oriented polarities. That is, when a north pole is on one side of the channel 31, immediately opposite therefrom is a south pole. Thus, each information element in tracks 37 comprises complementary north-south poles.

The sensing head or follower element 27 fits into the channel 31 and is guided by the channel as the channeling means 23 passes the sensing system. The follower element 27 has a resilient neck 43 so that when a railroad car carrying the identification plaque 23 passes over a stationary sensor system 25 the follower element 27 is able to follow in the channel 31. In this regard, the channel 31 has flared mouths 44 at both ends thereof to funnel the follower element 27 into the channel 31.

Also shown in FIG. 3 are two sensing elements 45A and B embedded in the sensing head 27. Each of these sensing elements comprises a sensor core 47 and a sensing coil 49. It will be appreciated that as the follower element or sensor head 27 passes through the channel 31 of the plastic housing 33 element pairs 39 of the magnetic-material-elements 35 induce currents in the sensor coils 49. In this regard, element pairs 39A in the first track 37A induce currents in the sensor coil 49A and element pairs 39B in the second track 37B induce currents in the sensor coil 49B.

Operation of the railroad car identification system depicted in FIGS. 1–3 is now described. As the railroad car 11 passes the stationary sensor system 25 the follower element or sensing head 27 is guided into the channel 31 of the channeling means or identification plaque 23 by the flared mouth 44. As the sensor head 27 moves through the channel 31 the magnets in the arrays of magnets 35 induce currents in the sensor coils 49A and B.

If the magnetic-material elements 35 are permanent magnets the natures or phases of the induced currents in the sensor coils 49 are dependent upon the north-south pole orientations of the respective element pairs 39. For example, if an element pair 39 provides a north pole on the left of the channel 31 and a south pole on the right of the channel 31 (as seen in FIG. 3) a binary 1 signal may be induced; and if these poles are reversed, a binary 0 signal may be induced.

It should be noted in FIG. 3 that lower portions 51 of the channeling means 23 are attached to a top portion of the channeling means 23 by means of tongue and groove connections 53. Thus, the lower portions 51 are replacable and, therefore, the first track 37A can easily be changed. In this respect, the second track 37B contains information which permanently identifies the railroad car 11 and the first track 37A contains information indicative of the railroad car's destination and freight.

Referring now to FIGS. 4–7, there are shown numerous modes of the element-pairs 39.

Figure 4:
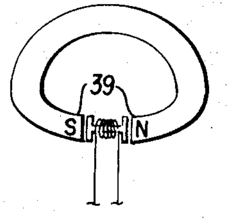
FIGS. 4–7 are schematic electrical/magnetic diagrams showing various modifications of magnetic-material identification elements of the identification plaque used in the FIGS. 1–3 embodiment of this invention.

In the FIG. 4 mode, each of the element pairs 39, forming a part of the identification plaque 23, are actually north and south poles of a U-shaped permanent magnet, rather than being bar magnets as shown in FIG. 3.

Figure 5:
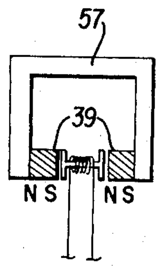

In the FIG. 5 mode, each of the element pairs 39, forming a part of the identification plaque 23, are permanent bar magnets, as in FIG. 3; however they are connected by an iron U-shaped pole piece 57.

Figure 6:
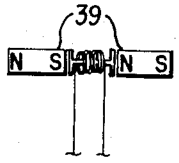

In the FIG. 6 mode, each of the element pairs 39, forming a part of the identification plaque 23, are magnetically unconnected permanent magnets, the same as in the FIG. 3 embodiment.

Figure 7:
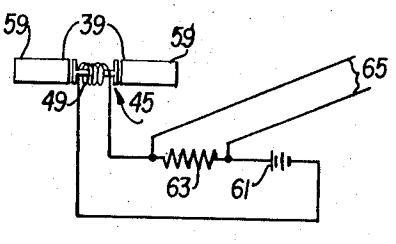

FIG. 7 depicts an embodiment wherein magnets must not be used as a part of the identification plaque 23 but rather iron slugs 59 can be used as the magnetic material elements 35. In this embodiment a voltage source 61 energizes the sensor coil 49 through a resistor 63. Thus, a sensing element 45 forms an electromagnet. As the sensing element 45 passes the iron slugs 59 flux flowing through the sensor coil 49 is modified, thereby modifying current in the sensor coil 49. An output signal is taken across the resistor 63 at terminals 65. The circuit of FIG. 7 may also be used to sense permanent-magnet record elements.

Figure 8:
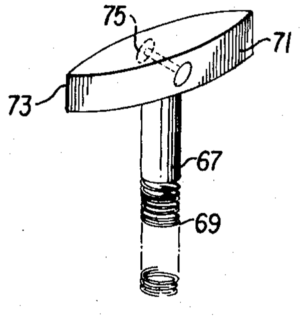
FIGS. 8–11 are assorted views of sensor-element followers which can be used in the FIGS. 1–3 embodiment of this invention.
Figure 9:
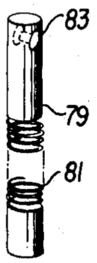
Figure 10:
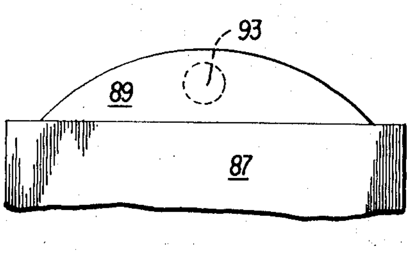

Turning now to FIGS. 8–10, there are shown three modifications of the sensing head 27 of the FIGS. 1–3 embodiment.

In FIG. 8 the sensing head or follower element comprises:

a resilient neck which includes a shaft 67 having a spring 69 therein; and a follower head 71 having an elongated shape with relatively sharp edges 73 at ends thereof. A sensing element 75 is positioned crosswise in the center of the elongated follower head 71.

In the FIG. 9 modification of the follower element or sensing head, a follower element comprises merely a resilient neck. The resilient neck includes a shaft 79 having a spring 81 therein. A sensing element 83 is embedded in a top portion of the shaft 79.

Figure 11:
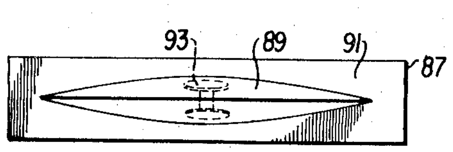

In the FIGS. 10 and 11 modification the follower element includes a base 87 and a vane-shaped follower element 89. The vane-shaped follower element 89 is mounted on the base 87 by means of a resilient connecting member such as a resilient membrane 91. A sensing element 93 is embedded in the vane-shaped follower element 89.

Figures 12, 13:
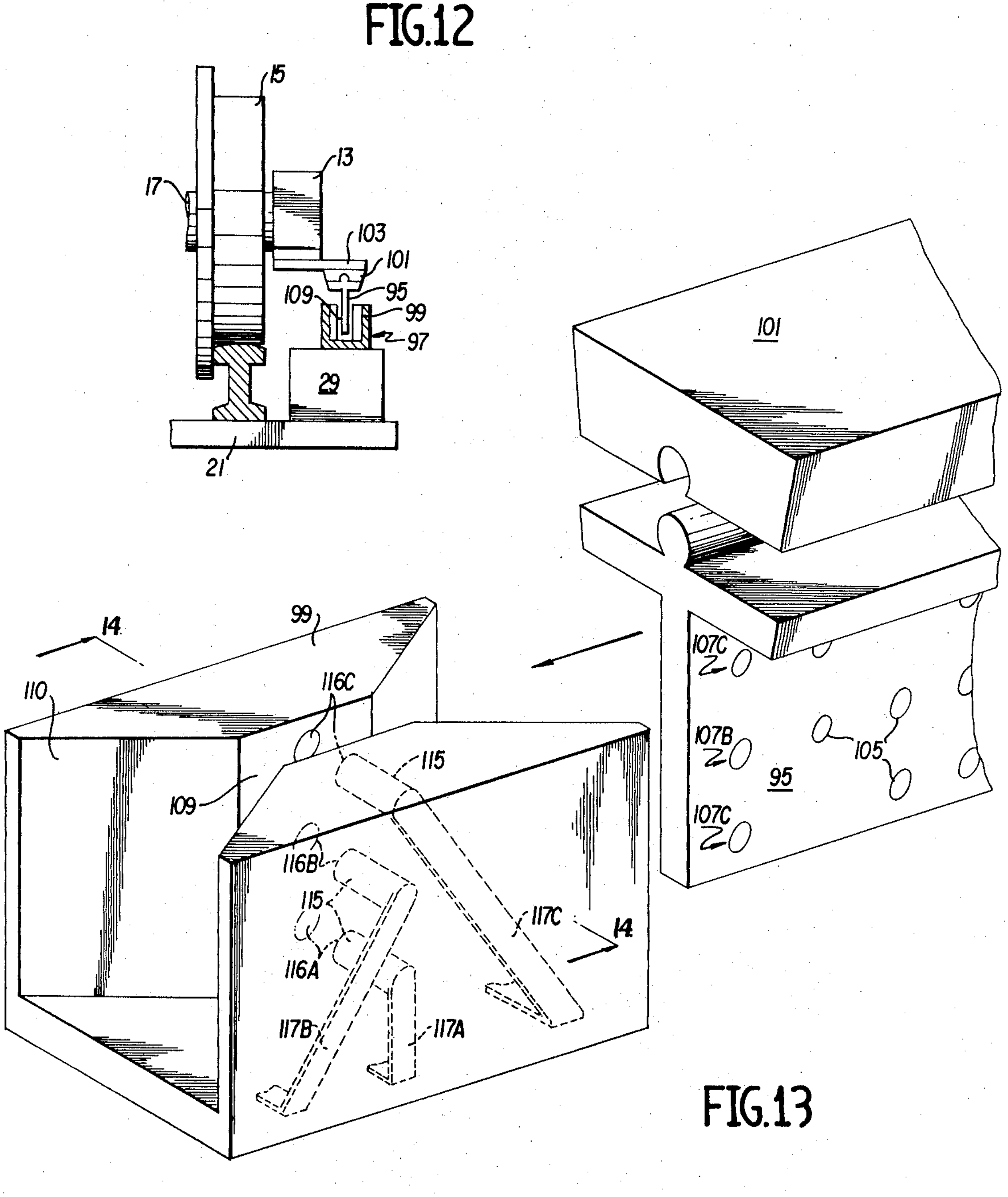
FIG. 12 is an end view of a portion of a railroad car having an identification plaque mounted thereon while passing over a stationary sensor system, said identification plaque and said sensor system employing principles of this invention.
FIG. 13 is an enlarged isometric view of portions of the identification plaque and the sensor head of FIG. 12.

Turning now to another embodiment, employing principles of this invention, depicted in FIG. 12, and using the same reference numerals to designate elements similar to elements of the FIGS. 1–3 embodiment, a railroad car identification system comprises a follower element or identification plaque 95 and a stationary sensing system 97. The stationary sensing system 97 includes a channeling means or sensor head 99 and a sensor logic circuit 29, which will be described below and is identical to the logic circuit 29 of FIG. 2. The follower element or identification plaque 95 is mounted on the wheel truck 13 by means of an attaching member 101 and a mounting member 103.

Referring now to FIG. 13, wherein the follower element or identification plaque 95 and the channeling means or sensor head 99 are shown in more detail. The follower element 95 contains an array of magnetic-material elements 105 which are arranged in three tracks 107A–C.

In the embodiments of this invention wherein the magnetic-material elements 105 are permanent magnets, the orientations of each of the magnets determines either a binary 0 or 1. Each track contains a binary word formed of element-bits. It should be noted that although there are three tracks on the follower element 95 the number of tracks is not necessarily a part of this invention.

The entire follower element or identification plaque 95 is selectively attachable to and detachable from the attaching member 101, and is therefore easily replacable. Thus, the information contained on an identification plaque 95 of a particular railroad car can be easily modified.

The channeling means or sensor head 99 is trough-shaped so as to form a channel 109 therein. The channel 109 is flared at mouths 110 thereof so as to more readily channel the follower element 95, into the channel 109 as the railroad car 11 passes the stationary-sensing system 97.

Sensing core elements 115 are arranged in pairs 116 with respective members of the pairs 116A and B being positioned on opposite sides of the channel 109; there being a sensor core pair 116A–C for each information track 107A–C on the follower element 95. The sensing core pairs 116 are joined by low reluctance paths 117A–C. It can be seen in FIG. 13 that the individual low reluctance paths 117A–C are offset one from the other to reduce flux interaction between the flux paths.

Figure 14:
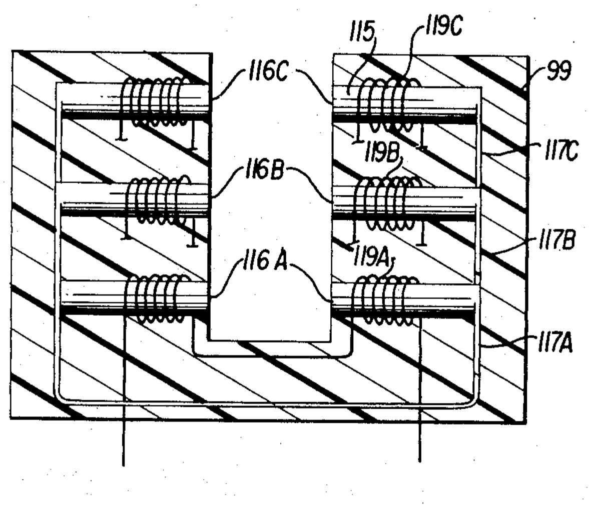
FIG. 14 is a sectional view taken on line 14—14 in FIG. 13 and also including additional details of sensor elements.

FIG. 14 essentially depicts a sectional view of the channeling means or sensor head 99 of FIGS. 12 and 13 and also includes sensor coils 119. Each of the sensor coils 119A–C are divided into two series connected portions, each portion being wound about a sensing core 115 of a sensing core pair 116.

In operation of the FIGS. 12–14 embodiment, as the railroad car 11 passes the stationary sensing system 97, the follower element or identification plaque 95 is guided through the channel 109 of the channeling means or sensor 99. Thus, the respective magnetic material elements 105 of the follower element or identification plaque 95 are caused to pass between sensing cores 115 of respective sensing-core pairs 116A–C, and thereby create flux changes in the low reluctance paths 117A–C. The flux changes induce current in the sensor coils 119.

In the embodiments of this invention wherein the magnetic-material elements 105 are permanent magnets, the orientations of the respective magnets determine the natures of electrical signals induced in the sensor coils 119, and the natures of these signals are indicative of binary bits represented by the respective magnets. The induced signals in the sensor coils 119 are fed to the sensor logic circuit 29 and are processed as will be described below.

Figure 15:
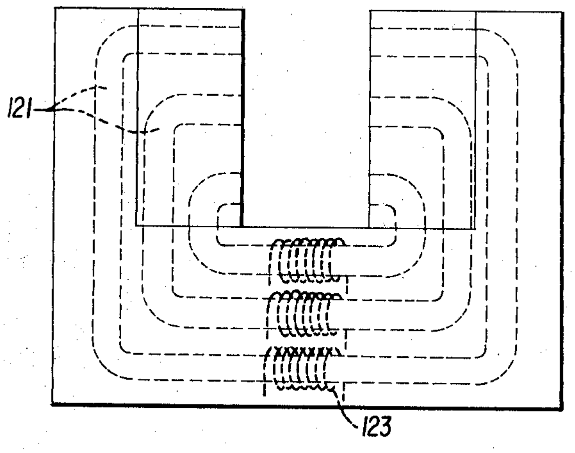
FIG. 15 is a sectional view of a modification of the sensor head of the FIGS. 13 and 14 embodiment.
Figure 16:
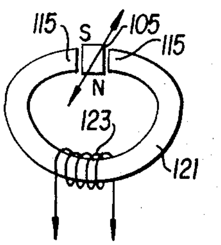
FIGS. 16 and 17 A and B are schematic electrical/magnetic diagrams of respective sensor-element electrical circuits to be used with the sensor systems of FIGS. 12–14.
Figure 17A:
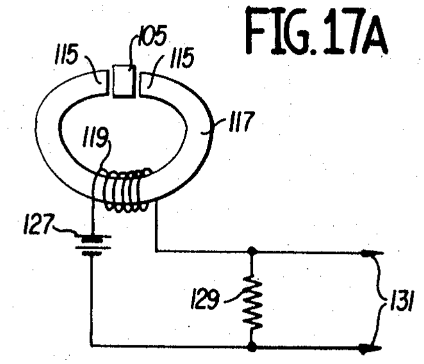
Figure 17B:
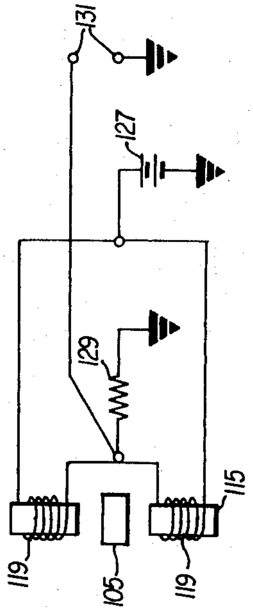

There are various forms that the sensing circuit of the FIGS. 12–14 embodiment of this invention can take, as are depicted in FIGS. 15–17.

In the FIG. 15 form, flux paths 121 are concentric rather than being offset one from the other as was the case in the FIGS. 13–14 embodiment. Also, in this form, undivided sensor coils 123 are used rather than the divided sensor coils 119 of FIG. 14. In this regard, the arrangement of sensor coils 119, as in FIG. 14, has the advantage of picking up flux close to the magnetic-material elements 105, whereas in the FIG. 15 embodiment, the flux dissipates somewhat before passing through the sensor coils 123 of FIG. 15. On the other hand, the FIG. 15 arrangement of sensor coils 123 has the advantages of simplicity and economy.

FIG. 16 depicts a mode of the FIGS. 12–14 embodiment wherein magnetic-material elements 105 are in the form of permanent magnets. The permanent magnet 105 shown in FIG. 16 is positioned between two sensor cores 115. The cores 115 are interconnected by a flux path 221 which is encircled by a sensor coil 123. As described above, the permanent magnet 105 causes a change in flux flowing through the sensor coil 123 so as to induce a current therein.

FIGS. 17 A and B depict two forms of another mode of the FIGS. 12–14 embodiment wherein magnetic material elements 105 may be in the form of iron slugs. In these cases, the sensor coils 119 are energized by voltage sources 127 in series with resistors 129. Thus, the sensor coils 119 and sensing cores 115 become electromagnets. The fluxes flowing through these electromagnets are modified when the iron slugs 105 pass between the sensing cores 115 thereby modifying the currents flowing through the sensor coils 119 and through the resistors 129. Output voltages are taken across resistors 129 at terminals 131 and fed to sensor logic circuits 29, which process these signals as is described below. The circuits of FIGS. 17A and B may also be used to sense permanent magnet record elements.

It will be understood by those skilled in the art that the magnetic railroad car identification systems described thus far are both rugged and accurate. Because the channeling means guide the follower elements through narrow channels, sensing elements can be brought not only into close proximity to magnetic material elements, but also directly between two magnetic material elements. Further, it should be appreciated that the identification plaques and sensor elements of this invention are not substantially affected by dirt, rain, chemicals or other ambient conditions.

Figure 20:
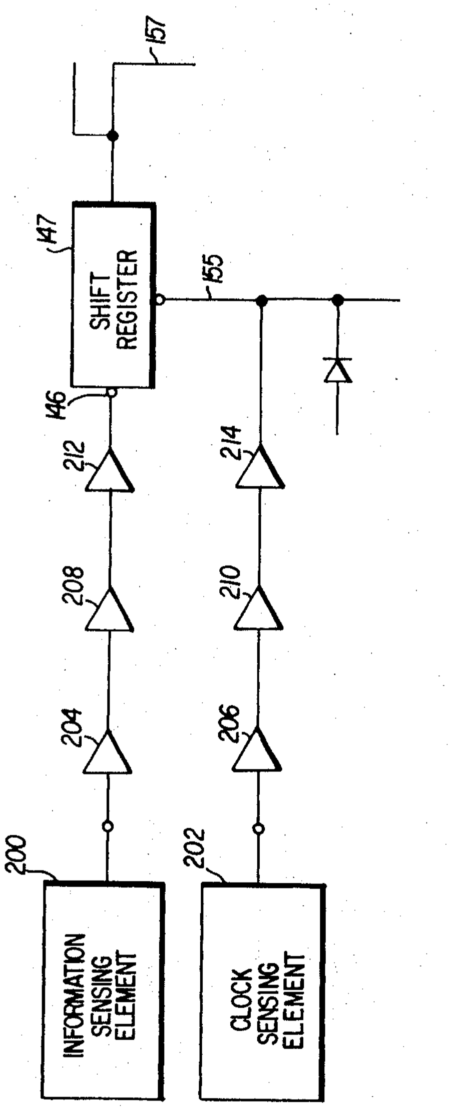
FIG. 20 is a block diagram of a portion of a logic circuit to be used with some embodiments of a magnetic identification system employing principles of this invention.
Figure 21:
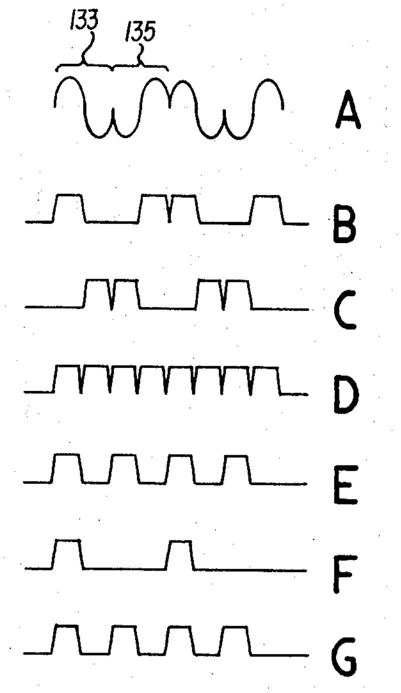
FIG. 21 is a diagrammatic representation of electrical waveforms at various points in the logic circuit of FIGS. 18 and 19.

Turning next to FIGS. 18–22, FIGS. 18 and 19 represent the sensor logic circuit 29 employed to process signals received from sensing coils 49 (in the FIG. 3 embodiment) and 119 (in the FIG. 14 embodiment) when the magnetic material elements, 35 (FIG. 3) and 105 (FIG. 14) respectively, are permanent magnets. FIG. 21 displays various waveforms at different points in this circuit.

Figure 18:
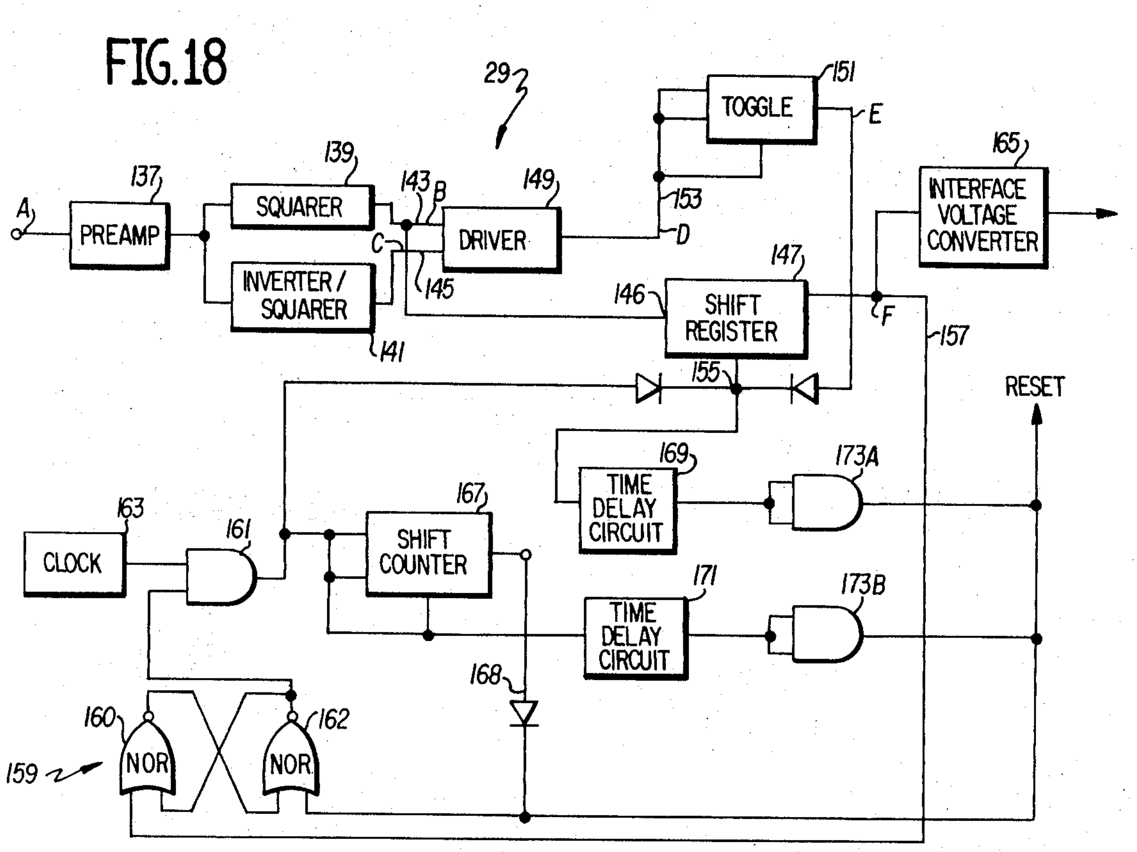
FIG. 18 is a block diagram of a sensor-system logic circuit to be used with magnetic identification systems employing principles of this invention.

In FIG. 18, a signal derived from either the sensor coils 49 of FIG. 3 or the sensor coils 119 of FIG. 14 are applied to a terminal A. These signals are shown in plot A of FIG. 21. It should be noted that as a sensor coil passes a magnet either a positive going wave followed by a negative going wave is induced in the sensor coil or a negative going wave followed by a positive going wave is induced. In this regard, the negative-positive sequence depends upon orientations of the poles of magnets 35 (FIG. 3) and 105 (FIG. 14). For example, a waveform 133 was induced by a first magnet pair (FIG. 3) and a waveform 135 was induced by a second magnet pair having a pole orientation opposite to that of the first magnetic pair. In the case of waveform 133 a positive wave precedes a negative wave and in the case of waveform 135 a negative wave precedes a positive pulse. For the purpose of explanation, the waveform 133 is arbitrarily chosen as indicating a binary 1 and the waveform 135 is arbitrarily chosen as indicating a binary 0.

These signals are fed to a preamplifier 137 which amplifies them in the order of 0.022–0.05 volts AC to a level of 1 to 5 volts AC.

The preamp 137 feeds the amplified signals into a squarer 139 and an inverter/squarer 141. The squarer 139 isolates the positive wave portions of the signals, squares these portions, and applies them to an information channel 143. The inverter/squarer 141 isolates the negative wave portions of the signals, inverts these portions and applies them to a line 145. In this regard, the waveforms appearing on the information channel 143 are shown in plot B of FIG. 21, and the waveforms on line 145 are shown in lot C of FIG. 21.

The pulses on the information channel 143 are fed directly into an information terminal 146 of a shift register 147 while the signals appearing on both the information channel 143 and the line 145 are fed into a timing circuit which comprises a driver 149 and a toggle switch 151. The shift register 147 is a master/slave arrangement of flip/flops which is relatively conventional and, therefore, not described herein.

The driver 149, an "exclusive OR" circuit accepts the separate pulse transmissions shown in plots B and C of FIG. 21 and recombines these pulses into a single transmission. The recombined pulses are applied to a toggle line 153 and have the waveforms of plot D in FIG. 21. Each of the positive pulses in the signal D represents a half cycle of an induced signal regardless of its polarity. This train of pulses is used to clock or gate the toggle 151 and the toggle 151 provides an odd pulse output plot E of FIG. 21, to a shift terminal 155 which shifts the shift register 147. Odd output pulses from the toggle 151 represent the first, third, fifth and so forth pulses appearing on line 153, and these odd pulses, in turn, represent the first halves of induced signals shown in plot A of FIG. 21. Thus, these pulses shift into the register the information contained in the first half cycle of each of the induced signals 133 and 135. Positive pulses appearing on the information channel 143 are shifted into the shift register 147 as binary 1's and no pulses are shifted into the shift register 147 as binary 0's.

When the shift register 147 is full it emits a pulse on a line 157 to a flip-flop NOR-type control gate 159, comprising cross-connected NOR gates 160 and 162. This pulse places the output terminal of the NOR gate 160 in a "low" state and the output terminal of the NOR gate 162 in a "high" state. Since the output of the NOR gate 162 is connected to the AND gate 161, the AND gate 161 is, in turn, set to allow pulses (plog G of FIG. 21) from a clock 163 to be transmitted to the shift terminal 155 of the shift register 147. These clock pulses shift information out of the shift register 147 through an interface voltage converter 165 to a computer (not shown). The clock 163 is of a relatively conventional design, and therefore, not described herein.

These same clock pulses, when first allowed through the AND gate 161, are counted by a shift counter 167. When the shift counter 167 is full, thus indicating that the shift register 147 is empty, it emits a command pulse to the NOR gate 162 on line 168. This pulse places the output terminal of the NOR gate 162 at a "low" state and the output terminal of the NOR gate 160 at a "high" state. This, in turn, disables the AND gate 161. Thus, further pulses from the clock 163 are cut off.

A first time delay circuit 169 is activated by the first pulse emited by the toggle 151. If after a predetermined time period the shift register 147 is not full, thus indicating that the sensing circuit has missed a bit of information, the time delay circuit 169 emits a signal to an AND gate 173A, and this signal clears and resets the various counters and registers throughout the sensing circuit. A second time delay circuit 171 is activated by the first clock pulse which appears at the input terminal of the shift counter 167. After measuring an elapse of time, the time delay circuit 171 emits a signal to AND gate 173B. This signal clears and resets the various counters and registers throughout the sensing circuit.

The shift counter 167 and time delay circuits 169 and 171 are of relatively conventional design, and, therefore, not described in detail herein.

The plot F in FIG. 21 represents the binary word that is stored in the shift register and is later shifted to a computer.

Figure 19:
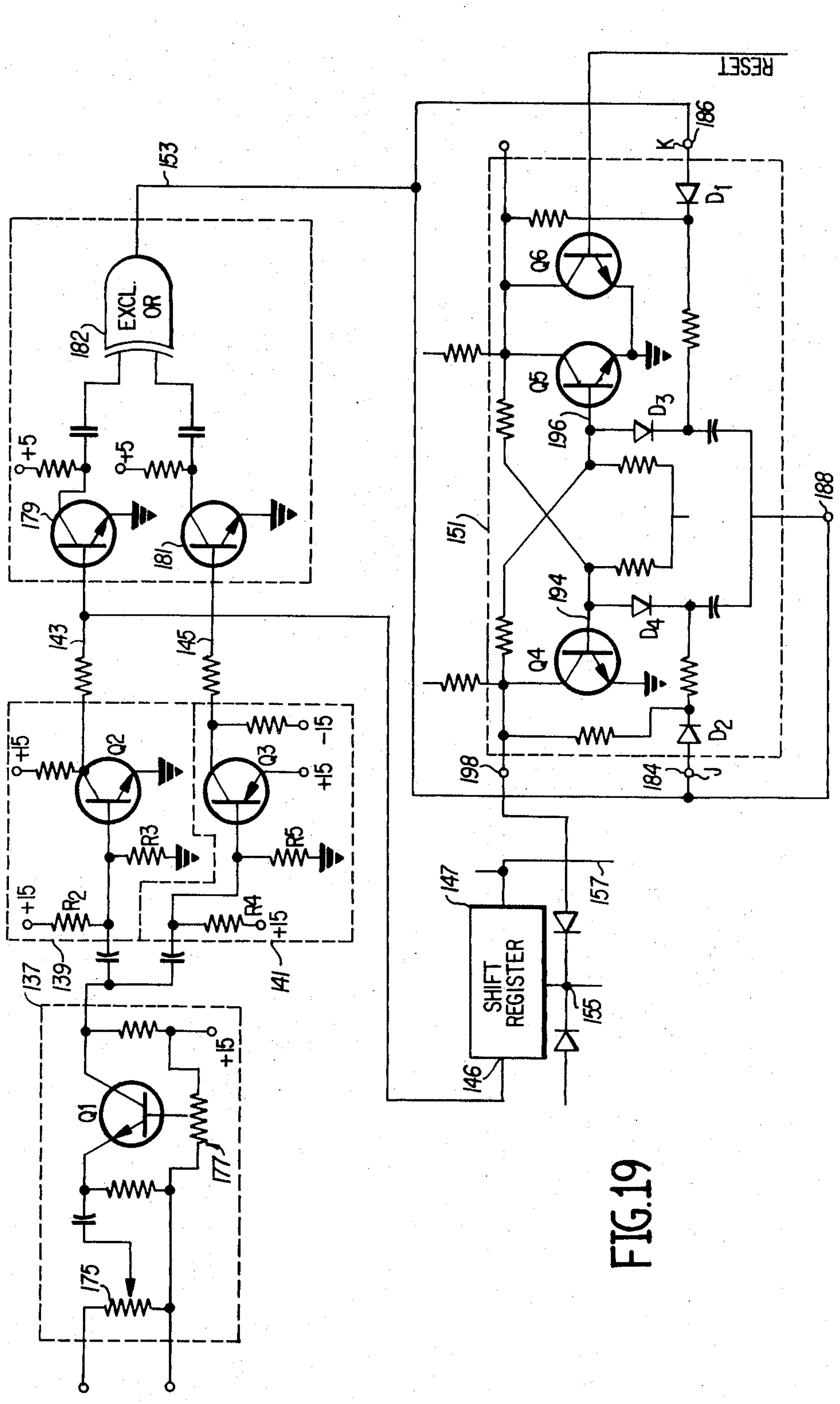
FIG. 19 is a schematic diagram of a portion of the logic circuit of FIG. 18.

FIG. 19 shows a portion of the circuit of FIG. 18 in more detail.

The preamp 137 comprises a potentiometer 175 for providing level control to the induced signals and a common base transistor amplifier, including a transistor Q1. A potentiometer 177 provides operation-point adjustment for the transistor $Q_1$. As was mentioned above, the preamp 137 amplifies signals in the order of 0.022–0.05 volts AC to a level of 1 to 5 volts AC.

The signal appearing at the output of the preamp 137 is applied to the squarer 139 and the inverter/squarer 141.

The squarer 139 comprises a npn transistor Q2 with a biasing voltage divider including resistors $R_2$ and $R_3$. The resistor $R_2$ is quite large relative to $R_3$ such that a bias on the base of the npn transistor $Q_2$ is relatively low. Thus, the transistor $Q_2$ operates near its lower saturation point and therefore transmits only positive portions of the signal received from the preamp 137. Because the transistor $Q_2$ is a npn type transistor these signals are recreated on the collector of transistor $Q_2$ as positive pulses. In addition, the positive pulses received from the preamp 137 drives the transistor $Q_2$ beyond its upper saturation level; thus, these signals are transmitted by the transistor $Q_2$ as square waves as shown in plot B of FIG. 21.

Regarding the inverter/squarer 141, a biasing voltage divider, comprises a relatively small resistance $R^4$ and a relatively large resistance $R_5$, provides a relatively high biasing voltage to the base of a pnp transistor Q3. In this manner, the transistor $Q_3$ is caused to operate near its upper saturation limit and therefore only transmits negative portions of the signal received from the preamplifier 137. Further, the transistor $Q_3$ is driven to its lower saturation level by the signals received from the preamplifier 137 and, therefore, passes these portions of the signal as square waves. In addition, since the transistor $Q_3$ is a pnp transistor, which is energized by a negative voltage source, it inverts these square pulses and they appear as shown in plot C of FIG. 21. The respective signals from the squarer 139 and the inverter/squarer 141 are applied to transistor amplifiers 179 and 181 in the driver circuit 149.

After amplifying the signals the transistor amplifiers 179 and 181 present the complementary pulses to an "exclusive OR" gate 182 where the pulses are combined to form a single train of pulses onto the line 153. The signal appearing on line 153 is as shown in plot D of FIG. 21.

The signal appearing on line 153 is applied to the toggle 151, and, as described above, the toggle 151 transmits every odd pulse to a shift-register shift terminal 155.

The toggle 151 comprises transistors $Q_4$ and $Q_5$ which are interconnected to form a JK flip flop. Pulses appearing on line 153 are applied to the toggle 151 at a K input terminal 184, a J input terminal 186, and a clock terminal 188. A JK input pulse back-biases diodes $D_3$ and $D_4$. This causes no change of the states of the transistors $Q_4$ and $Q_5$. However, on the negative portion of the clock pulse, a current flows through a diode, either $D_3$ or $D_4$, of the transistor $Q_4$ or $Q_5$ which has a positively biased base and is, therefore, conducting. This current lowers the respective base to ground voltage and the "on" transistor is thereby turned off and the "off" transistor is turned "on." Diodes $D_1$ and $D_2$ permit only positive pulses to enter the circuit.

Output pulses from the toggle 151 appear at the terminal 198 and are applied to the shift register shift terminal 155. As was described above, these pulses regulate the shift of pulses through the shift register 147.

A reset stage of the toggle 151 comprises a transistor $Q_6$. The transistor $Q_6$ is activated by reset signals from the AND gates 173A and B (FIG. 18) as was mentioned above. When the transistor $Q_6$ is activated the toggle 151 is placed in a starting state.

The signal appearing on the information channel 143 is applied to the information terminal 146 of the shift register 147 of FIG. 18.

It should be particularly noted that inclusion of the toggle 151 in the logic circuit of FIGS. 18 and 19 enables the circuit to distinguish between the original sinusoidal information waves which are 180° out of phase with one another, as shown in plot A of FIG. 21. Each of the information signals is sensed in sinuosidal form. However, depending upon the orientation of magnetic elements (as in FIG. 3 and 105 in FIG. 13), the first halves of cycles are either positive or negative. The toggle 151 enables the circuit to look at only the first half of each of the cycles.

FIG. 20 depicts a block diagram of a portion of a sensor logic circuit employed to process signals received from sensing coils 49 (in the FIG. 3 embodiment) and 119 (in the FIG. 14 embodiment) when the magnetic material elements, 35 (FIG. 3) and 105 (FIG. 14) respectively are iron slugs. In this regard, sensing circuits similar to those shown in FIGS. 7 and 17 A and B are employed to sense iron slugs.

In FIG. 20, an information sensing element 200 scans a first information track, such as track 107 A of FIG. 13, and a clock sensing element 202 scans a second track, such as track 107 B of FIG. 13. The sensing elements 200 and 202 could be similar to those of FIG. 14 which comprise sensor cores 115 and sensor coils 119.

The information sensing element 200 and the clock sensing element 202 emit waves to amplifiers 204 and 206 respectively. The amplifiers pass these signals to limiters 208 and 210 respectively. Essentially, the limiters 208 and 210 act as automatic gain control devices by standardizing the amplitudes of the signals. The limiters 208 and 210 feed the standardized signals to one shots 212 and 214. The information channel one-shot 212 provides an information output pulse having a width which is five times as wide as the width of a clock output pulse provided by the clock-channel one shot 214. The information output pulse is fed to the information terminal 146 of the shift register 147 and the clock output pulse is fed to the shift line 155 of the shift register 147. The wider information pulse insures that this pulse does not terminate until after the clock pulse has shifted the information into the shift register 147.

The shift register 147 is connected in a circuit similarly as in the FIG. 18 circuit and functions similarly as described above with reference to FIG. 18.

Thus, the FIG. 20 embodiment has a separate clock-pulse channel and is used when there is a separate clock-pulse track on a train identification plaque. It is necessary to have this extra track of information when iron slugs are used as magnetic-material identification-plaque elements because iron slugs do not convey information by virtue of their orientations, as do permanent magnets. However, permanent magnets oriented in one direction could also be used in the same manner as iron slugs when it is desired to do so.

It can be appreciated by those skilled in the art that while the invention has been particularly shown and described with reference to preferred embodiments, it will be understood by those skilled in the art that various changes in form and detail may be made therein without departing from the spirit and scope of the invention. For example, the channel-follower features of this invention could be used with types of sensors other than magnetic. For example, infrared sensors could be used to detect reflection type identification plaques. As in the case of magnetic sensing channeling standardizes the distance between infrared sensors and infrared data plates, thereby allowing "packing" of infrared data on smaller areas than is normally the practice. In the case of infrared sensors, data can be stored in "black-spots" or "punched-holes" tracks on signal cards attached to wheel trucks.

It should also be mentioned that "channeling," as described herein could also be accomplished by means of energy orientation as well as by mechanical orientation. That is, an infrared positioning sensor could sense the position of an identification plaque and, in response thereto, move an identification sensor in a proper position for reading the identification plaque.

The embodiments of the invention in which an exclusive property or privilege are claimed are defined as follows:

1. A movable-object identification system for identifying movable objects guided along a path by a track comprising:

an identification record mounted on an individual movable object; and a stationary sensing means separate from but positioned along said track, said stationary sensing means forming a channel for guiding said identification record and for reading information from said identification record, as said individual movable object is guided past said stationary sensing means by said track;

said identification record comprising:

a flat plate having two sides;

an array of magnetic material elements embedded in said flat plate, said magnetic material elements extending between said two sides; and a mounting means for mounting said flat plate to said movable object and allowing said flat plate to extend away from said movable object so as to expose said two sides;

whereby, as said individual movable object is guided past said stationary sensing means by said track, said flat plate can enter and be guided along said channel formed by said stationary sensing means.

2. A movable-object identification system as claimed in claim 1 wherein said magnetic material elements are iron slugs.

3. A movable-object identification system of the type comprising an identification record mounted on an individual movable object and a stationary sensing means, for reading information from said identification record as said individual movable object passes said stationary sensing means, said movable-object identification system comprising:

a channeling means comprising two opposing barriers for defining a channel space therebetween;

a follower means for engaging said opposing barriers so as to be guided into said channel space and thereafter to be guided along said channel space as said individual movable object passes said stationary sensing means, said follower means having freedom of lateral movement so as to allow such guidance;

wherein said channeling means is mounted on said movable object and said identification record is mounted on said channeling means, said identification record comprising magnetic material elements arranged in tracks, with each track comprising complementary magnetic-material elements respectively forming parts of opposing barriers of said channeling means; and, wherein said stationary sensing means comprises said follower means having an electrical conducting element attached thereto;

whereby, as said follower means is guided along said channel space by said opposing barriers said electrical conducting element passes between said complementary magnetic material elements.

4. A movable-object identification system as claimed in claim 3 wherein complementary magnetic-material elements comprise north and south poles of a single magnet.

5. A movable-object identification system as claimed in claim 3 wherein complementary magnetic-material elements comprise separate magnets which are joined by magnetic material.

6. A movable-object identification system as claimed in claim 3 wherein said magnetic-material elements comprise individual magnets which are not interconnected by magnetic material.

7. A movable-object identification system as claimed in claim 3 wherein said magnetic-elements comprise iron slugs.

8. A movable-object identification system as claimed in claim 7 wherein said stationary sensing means comprises a voltage source which is connected in series with said electrical conducting element and a resistor.

9. A movable-object identification system for identifying objects guided along a path by a track, of the type comprising an identification record mounted on an individual movable object and a stationary sensing means positioned along said track, for reading information from said identification record as said individual movable object is guided past said stationary sensing means by said track, said movable-object identification system comprising:

a channel means separate from said track comprising two opposing barriers for defining a channel space therebetween; and a follower means for engaging said opposing barriers so as to be guided into said channel space and thereafter to be guided along said channel space as said individual movable object passes said stationary sensing means, said follower means having freedom of lateral movement so as to allow such guidance;

wherein said channeling means forms a part of said stationary sensing means and includes a U-shaped magnetic core with arms embedded in opposite walls of said channeling means;

wherein said follower means is mounted on said movable object and comprises at least one track of information elements for forming said identification record; and whereby, as said follower means is guided along said channel space by said opposing barriers said information elements pass between said opposing barriers and adjacent said sensing device.

10. A movable-object identification system as claimed in claim 9 wherein said stationary sensing means comprise a voltage source which is connected in series with an electrical conducting element and resistor.

11. In a movable-object identification system for identifying objects guided along a path by a track, of the type comprising an identification record mounted on an individual movable object and a stationary sensing means positioned along said track, for reading information from said identification record as said individual movable object is guided past said stationary sensing means by said track, an identification record comprising:

a channel means separate from said track comprising two opposing barriers for defining a channel space therebetween for guiding said stationary sensing means into said channel space and thereafter to guide said stationary sensing means along said channel space;

an array of complementary magnetic material elements embedded opposite one another in said two opposing barriers wherein said array of magnetic material elements is arranged in tracks, with each track comprising complementary magnetic-material elements mounted on opposing sides of said channeling means;

whereby, as said individual movable object is guided past said stationary sensing means by said track, a follower of said stationary sensing means can be guided into, and be guided along, said channel space by said two opposing barriers.

12. A movable-object identification system as claimed in claim 11 wherein said complementary magnetic-material elements comprise north and south poles of a single magnet.

13. A movable-object identification system as claimed in claim 11 wherein complementary magnetic-material elements comprise separete magnets which are jointed by a pole piece.

14. A movable-object identification system as claimed in claim 11 wherein said magnetic-material elements comprise individual magnets which are not interconnected by magnetic material.

15. A movable-object identification system as claimed in claim 11 wherein said magnetic-material elements are iron slugs.

16. A movable-object identification system for identifying objects guided along a path by a track, of the type comprising magnetic-array identification records mounted on separate movable objects and an induction-coil type stationary sensing means positioned along said track in which magnetic elements, each having one of two opposite pole orientations, of said magnetic-array identification records induce electrical signals, each having one of two positive/negative waveform orientations induced by said respective pole orientations, as said separate movable objects are guided past said stationary sensing means by said track wherein said movable-object identification system comprises a sensor logic circuit which includes:

a shift register for receiving said induced electrical signals on a single line and at a single shift-register terminal and shifting information contained in said induced electrical signals into said register for storing said information and, a timing means for causing said shift register to shift negative/positive information contained in the same predetermined portion of each of said induced electrical signals to thereby determine the pole orientations of each of said magnetic elements.

17. A movable-object identification system as claimed in claim 16 wherein said timing means includes a counting means for counting negative portions and positive portions of said signal and providing said shift register a shifting pulse in response to said count.

18. A movable-object identification system as claimed in claim 17 wherein said counting means comprises:

a signal separating means for separating first-polarity and second-polarity portions of said induced signal;

an inverting means for inverting second-polarity portions of said induced signals; and a recombining means for recombing said separated portions.

19. A movable-object identification system as claimed in claim 18 wherein said counting means counts said recombined portions and provides a shifting pulse to said shift register in response to every second portion counted.

20. A movable-object identification system as claimed in claim 18 wherein said first polarity portions provide information that is shifted into said shift register.

21. A movable-object identification system as claimed in claim 16 wherein said logic circuit further includes a clock means for providing shifting pulses to said shift register in response to said shift register being full.

22. A movable-object identification system as claimed in claim 21 wherein said logic circuit further includes a shift counter for counting clock pulses applied to said shift register by said clock and a gate means for blocking clock shifting pulses to said shift register in response to said shift counter reaching a predetermined count.

23. A movable-object identification system as claimed in claim 22 wherein said logic circuit further includes a reset circuit which comprises a reset means for resetting said shift register and said shift counter a predetermined time period after said timing means begins to provide shifting pulses to said shift register and a predetermined time period after said clock begins to provide shifting pulses to said shift register.

24. A movable-object identification system for identifying objects guided along a path by a track, of the type comprising an identification record mounted on an individual movable object and a stationary sensing means positioned along said track for reading information from said identification record as said individual movable object is guided past said stationary sensing means by said track, said movable object identification system comprising:

a channeling means separate from said track comprising two opposing barriers for defining a channel space therebetween;

a follower means for engaging said opposing barriers so as to be guided along said channel space as said individual movable object passes said stationary sensing means, said follower means having freedom of lateral movement so as to allow such guidance;

wherein;

said channeling means and said follower means are structurally associated with said identification record and said stationary sensing means such that, as said follower means is guided along said channeling means, said sensing means is held is close proximity to said identification record;

said identification record comprises an array of magnetic-material elements, each having one of two opposite pole orientations;

said stationary sensing means comprises an induction coil for having a series of electrical signals induced therein in response to movement of said magnetic-material elements in close proximity to said induction coil, each having one of two positive/negative waveform orientations induced by said respective pole orientations; and said movable-object identification system further comprises a sensor logic circuit which includes:

a shift register for storing information contained in said series of induced electrical signals; and timing means for causing said shift register to only shift negative/positive information contained in the same predetermined portions of said induced electrical signals into said shift register.

* * * * *